(12) United States Patent
Hopwood et al.

(10) Patent No.: US 8,061,960 B2
(45) Date of Patent: Nov. 22, 2011

(54) APPARATUS FOR PLACING BATTERY PLATES

(75) Inventors: Robert T. Hopwood, Gloucestershire (GB); Christopher S. Barge, Bristol (GB)

(73) Assignee: TBS Engineering Limited, Cheltenham (GB)

( * ) Notice: Subject to any disclaimer, the term of this patent is extended or adjusted under 35 U.S.C. 154(b) by 405 days.

(21) Appl. No.: 12/282,202

(22) PCT Filed: Mar. 9, 2007

(86) PCT No.: PCT/GB2007/000835
§ 371 (c)(1),
(2), (4) Date: Jan. 12, 2009

(87) PCT Pub. No.: WO2007/104947
PCT Pub. Date: Sep. 20, 2007

(65) Prior Publication Data
US 2009/0292398 A1    Nov. 26, 2009

Related U.S. Application Data

(60) Provisional application No. 60/744,529, filed on Apr. 10, 2006.

(30) Foreign Application Priority Data

Mar. 10, 2006    (GB) .................................. 0604831.8

(51) Int. Cl.
B65G 59/00    (2006.01)
(52) U.S. Cl. ................. 414/795.8; 198/468.4; 414/797; 414/796.7

(58) Field of Classification Search .................. 198/408, 198/468.4, 471.1; 221/211, 225; 271/150, 271/158–159, 194, 197, 94–96; 29/623.1; 525/795.8, 796.5, 796.6, 796.7, 796.9, 797, 525/797.1, 797.2, 797.3, 797.7; 414/795.8, 414/796.5, 796.6, 796.7, 796.9, 797, 797.1, 414/797.2, 797.3, 797.7
See application file for complete search history.

(56) References Cited

U.S. PATENT DOCUMENTS 2,652,161 A  *  9/1953  Herzig et al. ................. 414/796
(Continued)

FOREIGN PATENT DOCUMENTS
DE            1 923 441 A1       1/1971
(Continued)

OTHER PUBLICATIONS

European Search Report for Application No. GB 0604831.8 dated Jun. 29, 2006.

(Continued)

*Primary Examiner* — Gregory Adams
(74) *Attorney, Agent, or Firm* — Marshall, Gerstein & Borun LLP (57) ABSTRACT

This invention relates to apparatus for placing battery plates in a line from a stack of plates including an elevator for receiving a stack of plates and sequentially elevating the stack to maintain, in use, the uppermost plate in the stack in a datum region lying between two parallel generally horizontal planes and a plurality of vacuum heads arranged in a closed loop for sequentially passing over the elevator with a fixed gap from the upper plane of the datum range for picking up the uppermost plate and for subsequently releasing the plate at a release position.

27 Claims, 7 Drawing Sheets

U.S. PATENT DOCUMENTS

| | | | |
|---|---|---|---|
| 2,897,950 A * | 8/1959 | Reed | 198/418.3 |
| 3,198,348 A * | 8/1965 | Cummings | 198/575 |
| 3,305,233 A | 2/1967 | Cody | |
| 3,334,891 A * | 8/1967 | Clausen et al. | 271/12 |
| 3,463,483 A | 8/1969 | Keller et al. | |
| 3,476,241 A | 11/1969 | Ungerer | |
| 3,480,160 A | 11/1969 | Barradell-Smith et al. | |
| 3,830,489 A | 8/1974 | Adams | |
| 3,858,709 A * | 1/1975 | Banyas et al. | 198/377.08 |
| 4,024,963 A * | 5/1977 | Hautau | 414/795.3 |
| 4,067,458 A | 1/1978 | Schneider et al. | |
| 4,211,398 A | 7/1980 | Bishop | |
| 4,281,452 A * | 8/1981 | Kolosov et al. | 29/623.1 |
| 4,381,596 A * | 5/1983 | Simonton et al. | 29/623.1 |
| 4,412,738 A | 11/1983 | Ahern et al. | |
| 4,635,921 A | 1/1987 | Thomas | |
| 4,784,380 A | 11/1988 | Eberle | |
| 4,869,489 A * | 9/1989 | Wirz et al. | 271/90 |
| 4,871,348 A | 10/1989 | Konaka | |
| 4,997,178 A | 3/1991 | Ogoda | |
| 5,470,195 A * | 11/1995 | Blank et al. | 414/797 |
| 5,671,920 A | 9/1997 | Acquaviva et al. | |
| 5,899,341 A | 5/1999 | Irita | |
| 6,030,171 A | 2/2000 | Johnson et al. | |
| 6,419,217 B1 | 7/2002 | Hartmann et al. | |
| 6,558,109 B2 * | 5/2003 | Gibbel | 414/795.5 |
| 6,736,589 B2 * | 5/2004 | Sichera et al. | 414/737 |
| 6,971,838 B2 | 12/2005 | Johnson et al. | |
| 7,007,940 B2 | 3/2006 | Polidoro et al. | |
| 7,007,942 B1 | 3/2006 | Stearns et al. | |
| 2003/0012636 A1 * | 1/2003 | Fujino et al. | 414/795.8 |
| 2004/0081544 A1 * | 4/2004 | Johnson et al. | 414/797 |
| 2008/0253867 A1 | 10/2008 | Barge | |

FOREIGN PATENT DOCUMENTS

| | | |
|---|---|---|
| DE | 38 06 419 A1 | 9/1989 |
| EP | 0 018 057 A2 | 10/1980 |
| EP | 860259 A2 * | 8/1998 |
| EP | 0 950 624 A2 | 10/1999 |
| EP | 1 031 523 A2 | 8/2000 |
| EP | 1 295 823 A1 | 3/2003 |
| EP | 1 608 574 | 12/2005 |
| FR | 1546148 A | 11/1968 |
| GB | 2 092 117 A | 8/1982 |
| GB | 2092117 A * | 8/1982 |

OTHER PUBLICATIONS

International Search Report for Application No. PCT/GB07/000835 dated Jun. 27, 2007.

European Search Report for European Application No. 08251050 dated Jul. 12, 2011.

* cited by examiner

APPARATUS FOR PLACING BATTERY PLATES

This invention relates to apparatus for placing battery plates in a line from one or more stacks of plates.

It is well known, during the manufacture of batteries containing battery plates to have to take battery plates from stacks, formed when the batteries are moulded, and to lay them into a line for subsequent handling, when they are formed into groups with separators and properly orientated terminals. In recent years many parts of the assembly line have been speeded up and there is a need for apparatus which can perform this function at high speed. With this in mind, arrangements such as are illustrated in U.S. Pat. Nos. 4,784,380 and 6,971,838 have been developed where multiple in line heads pick up battery plates from respective stacks and then deliver them onto a conveyor. By mounting these heads in line on a rocking or translatable carrier five or so plates can be deposited simultaneously, in line, on a conveyor. These systems have been found to have speed limitations, which do not enable them to meet the requirements of a modern line.

A further problem, which is recognised in U.S. Pat. No. 6,971,838, arises from the porous nature of many plates which now need to be handled and the need to ensure that only one plate is being picked up at a time.

From one aspect the invention consists in apparatus for placing battery plates in a line from a stack of plates, including an elevator for receiving a stack of plates and sequentially elevating the stack to maintain, in use, the uppermost plate in the stack in a datum range lying between two parallel generally horizontal planes and a plurality of vacuum heads for sequentially passing over the elevator with a fixed gap from the upper plane of the datum range for picking up the uppermost plate and for subsequently releasing the plate at a release position.

The applicants have realised that, surprisingly, they can create apparatus capable of much higher speeds from a single stack, rather than taking the plates from a multiplicity of in line stacks. This is because with the vacuum heads arranged in a loop there is not the same requirement for acceleration and deceleration as occurs in the earlier design. Further, by having an elevator which places the uppermost plate in a predetermined datum region, the geometry of the relationship between the position of the plate and the vacuum head can be particularly simply designed, with the result that no contact is required between the plate and the vacuum head. This prevents damage to the plates which can occur if a plate is drawn across the top of the one beneath it as has been seen with other plate handling systems that wipe the plates from the stack.

In a preferred embodiment the apparatus further includes a carrier rotatable about a generally vertical axis, in which case the vacuum heads may be mounted on the carrier and spaced around the axis.

There may be an evacuable plenum, which may also be mounted on the carrier, and in this case each vacuum head may be connectable to the plenum by a respective valve. A control may be provided for opening a valve associated with a head as the head approaches the elevator and for closing the valve when the head is in the release position.

Conveniently an output conveyor extends beneath the release position for receiving the release plates.

An input conveyor for delivering stacks of plates to the elevator may also be provided.

There may be a plurality of elevators moveable between an inactive position where a stack can be received and an active position. Conveniently there can be two elevators arranged diametrically relative to the axis, in which case the apparatus includes an input conveyor extending along the diameter. The apparatus may further include a turntable for rotating a stack before it is fed to one of the conveyors and preferably that one conveyor is the most downstream conveyor. Conveniently an elevator can perform the role of a turntable.

This turntable enables the stacks to be orientated in an appropriate position for their elevator so that, when released, the plates in the line have a common orientation.

From another aspect the invention consists in apparatus for placing battery plates in a line from stacks of plates including a plurality of vacuum heads for picking up, in a pick-up position a top most plate from a stack and subsequently releasing it at a release position and a carrier for carrying the heads and moving them between the pick-up and release positions, wherein in the pick-up position there is a space, in use, between the uppermost plate and the associated vacuum head, whereby the plates moves to the head.

Although the invention has been defined above it is to be understood that it includes any inventive combination of the features set out above or in the following description.

The invention may be performed in various ways and a specific embodiment will now be described, by way of example with reference to the accompanying drawings in which:

FIGS. 6(a) and (b) are respective side and front views of an elevator location.

Figure 1:
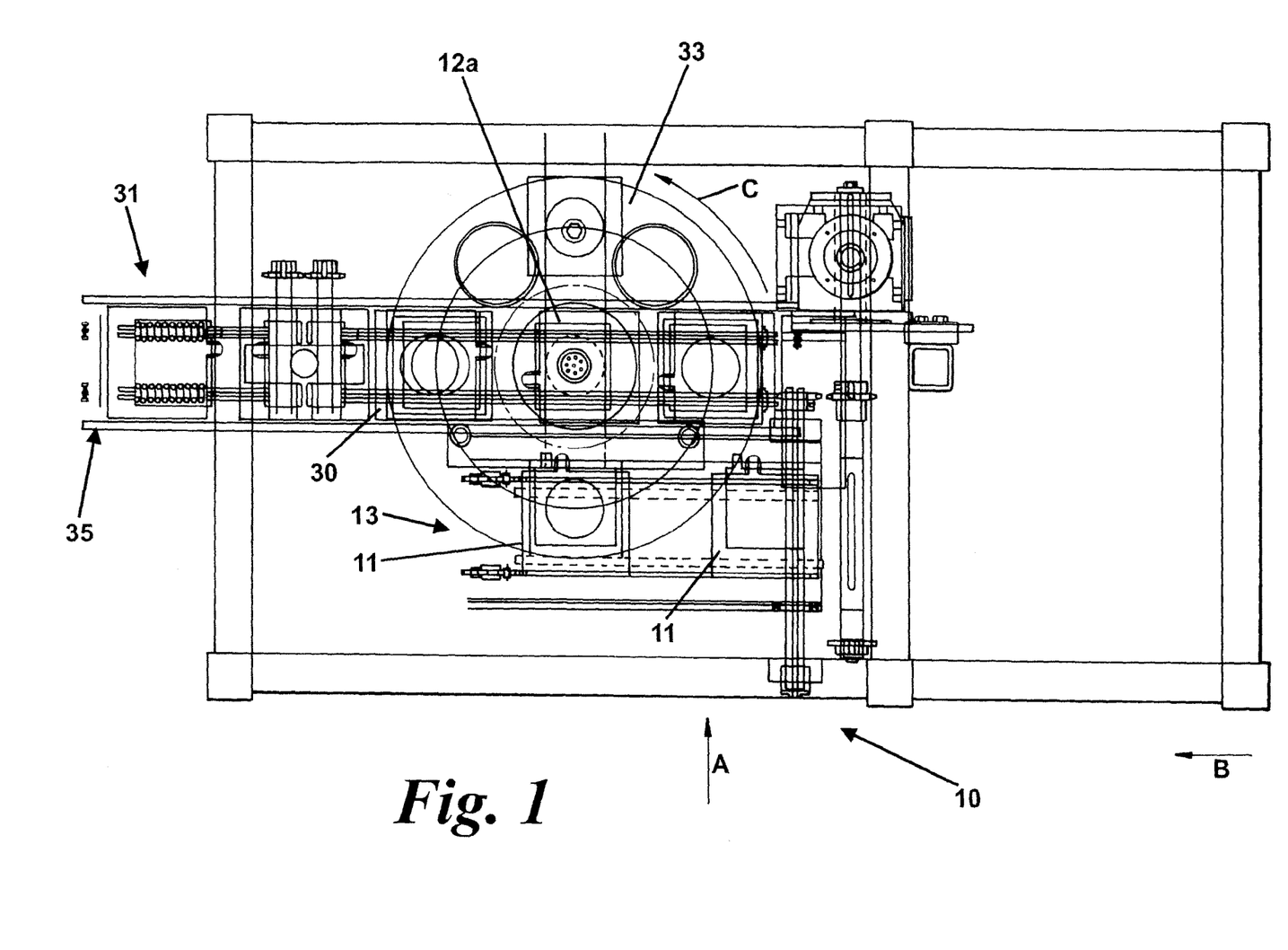
FIG. 1 is a plan view of apparatus for placing battery plates in a line from a stack of plates.
Figure 2:
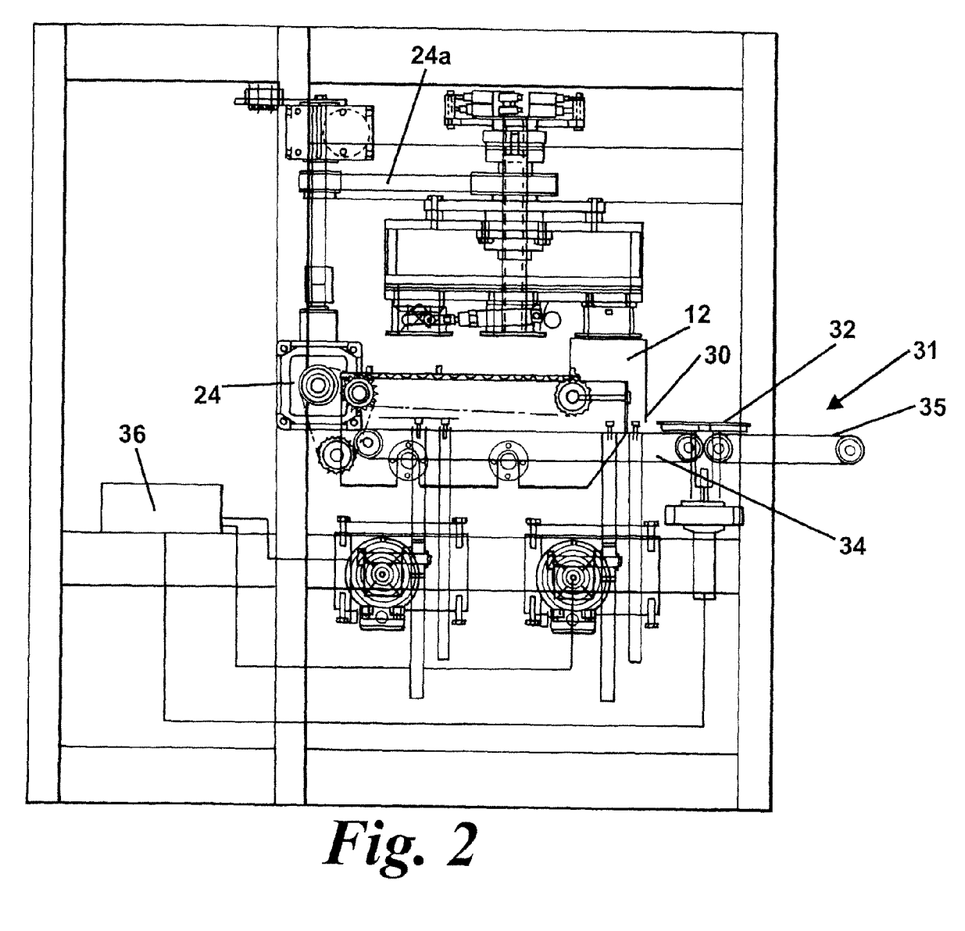
FIG. 2 is a view of the apparatus of FIG. 1 on the Arrow A.
Figure 3:
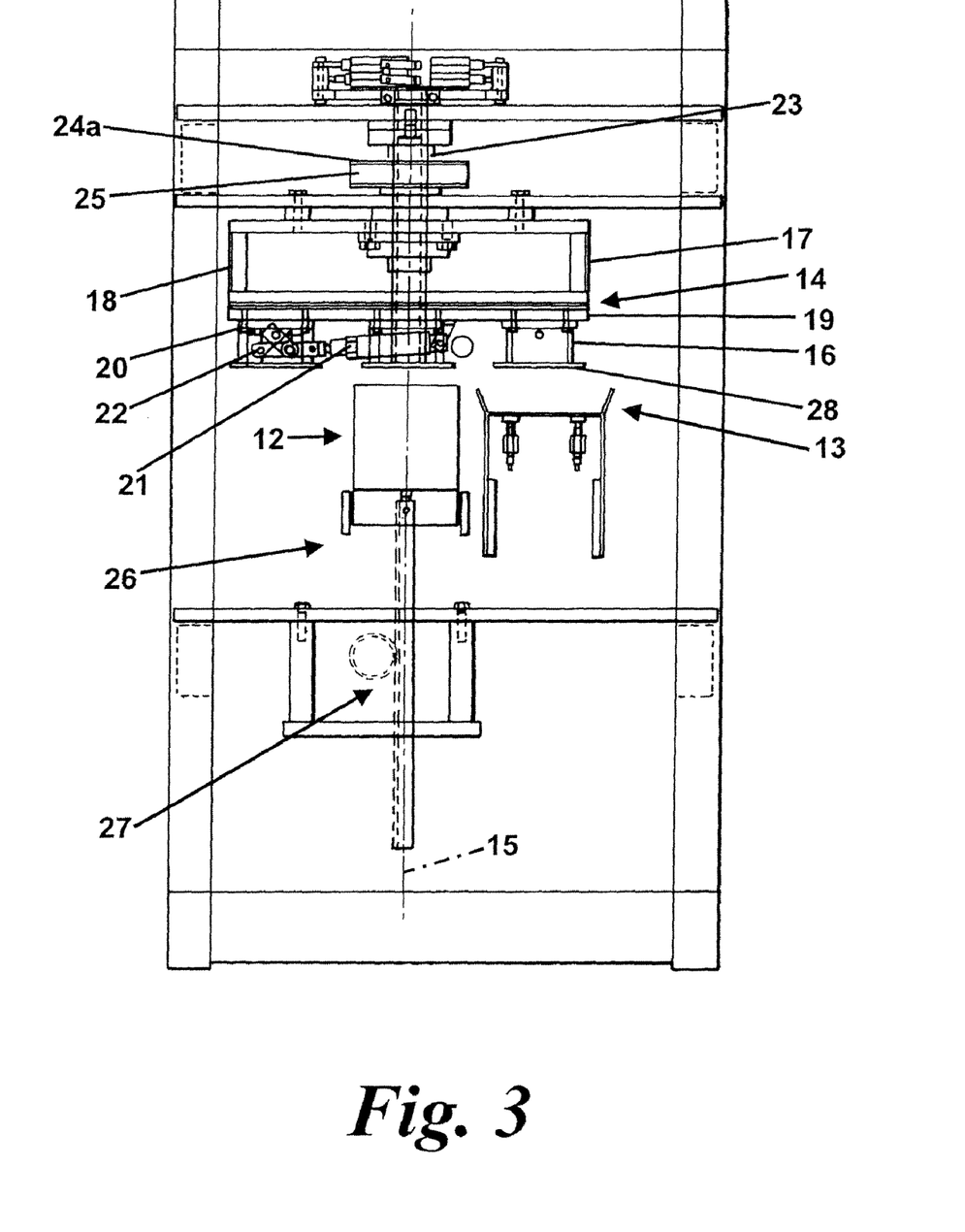
FIG. 3 is an end view of the apparatus in the direction B.

Referring to FIGS. 1 to 3, apparatus generally indicated at 10, is provided for taking plates 11 from a stack 12 and depositing them sequentially in line on a conveyor 13. The apparatus 10 includes a carrier 14 rotatable about a vertically extending axis 15, which carries a number of vacuum heads 16, which are spaced circumferentially around the carrier 14. The carrier also carries a box 17 that defines an evacuable plenum 18, which is on the one hand connected to a vacuum source (not shown) and on the other hand communicates with respective heads 16 via tubes 19 that are open and closed by respective butterfly valves, one of which is shown at 20. The valves 20 can be moved between open and closed positions, for example by the ram 21 and toggle actuator 22. A motor 24, is provided for rotating the carrier on a shaft 23 in the direction of the Arrow C by means of a pulley 24a and belt 25.

As can be seen in FIG. 3 the stack 12 is mounted on an elevator 26, which can be raised and lowered by means of a rack and pinion arrangement indicated at 27.

In its simplest form of operation, the carrier 14 is rotated and as a particular head 16 approaches the elevator 26, its butterfly valve 20 is opened connecting the head 16 to the source of vacuum by means of the plenum 18. As the "on" head 16 passes over the uppermost plate 11 in the stack it lifts the plate onto the vacuum head 16 whereupon it is carried, from this pick-up position over the elevator 26 to a release position over the conveyor 13. At that point the butterfly valve 20 is closed, removing the vacuum and releasing the plate 11 to drop onto the conveyor 13.

It is preferred, particularly when porous plates have been handled, that the mouth 28 is relatively large and the vacuum source and plenum are arranged so as to encourage fairly high air flow, but low vacuum. This is because as ingressing air sweeps across the surface of the uppermost plate it tends to cause an aerodynamic lift separating the uppermost plate from the stack, and enabling it to be captured by a low vacuum and reducing the chance of more than one plate 11 being picked up at once.

Because the carrier 14 is constantly rotating, without any need for deceleration, it can be rotated at high speeds, with the result that, even though only one plate is being picked up at a time, plates can be delivered onto the conveyor at rates at least up to 200 plates per minute.

It will be understood that in order to benefit significantly from such high delivery rates, it is desirable to have a system for replenishing the stack as quickly as possible. The applicants have arranged for this conveniently by providing a second elevator 29, which is located diametrically opposite the first elevator 12, so that whilst one elevator is in an active position from which plates can be picked up, the other elevator can be in an inactive position in which it can receive a fresh stack of plates. Because the elevators 26 and 29 are opposite each other, it is necessary to ensure that the stacks provided are orientated so that the stacks provided to one elevator are 180° rotated as compared with those provide to the other elevator. This can be achieved in a number of ways one of which is illustrated in the drawings. Here a conveyor system generally indicated at 31 brings stacks 12 sequentially to a turntable 32 that can be elevated through the plane of the conveyor system 31 to temporarily retain a stack 12 and, if necessary rotate it.

If elevator 12 is in the active position and plates are being removed from it, then elevator 30 should be in its inactive lowered position beneath the plane of the conveyor system 31. The turntable 32 will then rotate through 180° a first stack that it has received, lower those back onto the conveyor system 31 so that they are fed into a buffer position 33, beneath the shaft 23. As it will be noted that the conveyor system 31 is formed by two aligned conveyors 34 and 35. It will be understood that the rotated stack 12a can be retained in the buffer position by pausing the conveyor 34. The turntable 32 can then either stay lowered and simply allow the next stack to pass onto the elevator 30, which can capture the stack by passing up through the plane of the conveyor system 31 or it can retain it temporarily so that it can release the stack with position timing to meet the elevator 32 as it rises. When the elevator 26 has been emptied, the elevator 30 then rises up into its active position and plates are picked up from there so that there is no gap in the provision of the plates. It may be desirable to adjust the rotational speed of the carrier at least momentarily, because the elevator 30 is a shorter distance from the conveyor 13 than the elevator 12 and it will usually be desirable for there to be equal spacing between the plates 11. A similar effect could be achieved by varying the speed of the conveyor 13.

A control 36 is provided for controlling the motor, the valves and the various conveyors and elevators in accordance with the operational protocol described above. A means of controlling such elements would be well understood by one skilled in the art.

Figure 4:
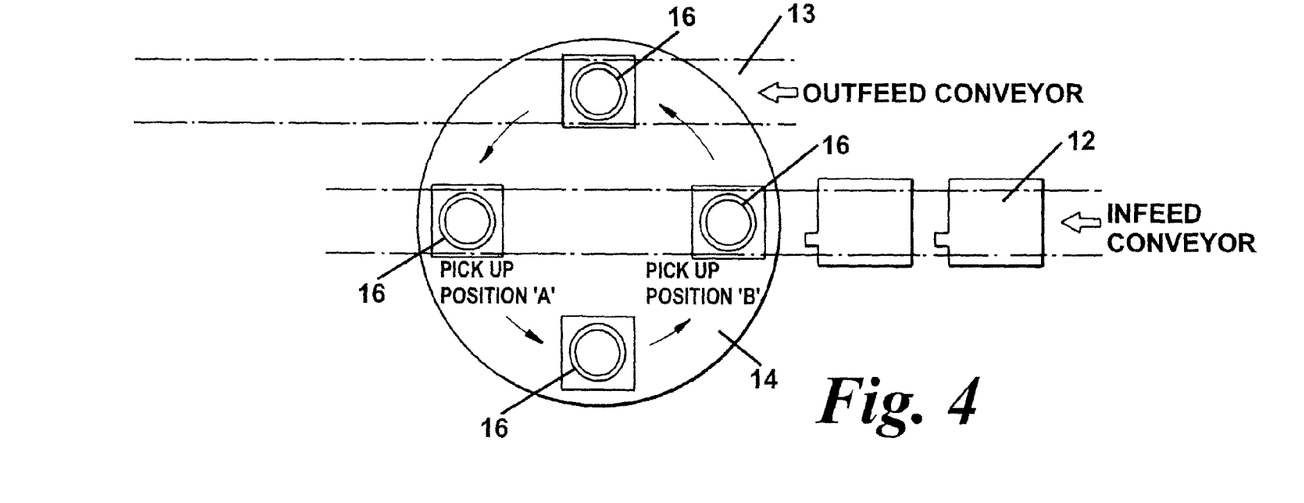
FIG. 4 is a schematic view from above of the carrier of the apparatus of FIG. 1.
Figure 5A:
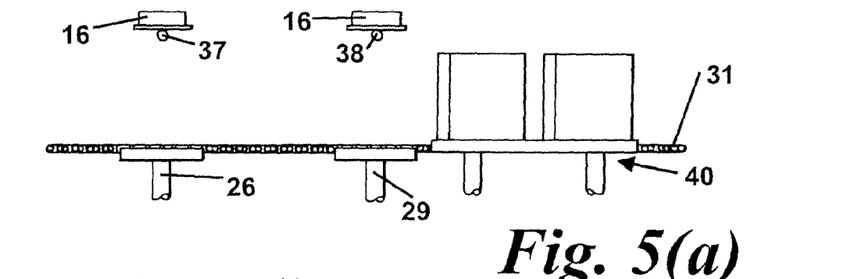
FIG. 5(a) to (o) indicate a supply sequence to the carrier of FIG. 4.
Figure 5B:
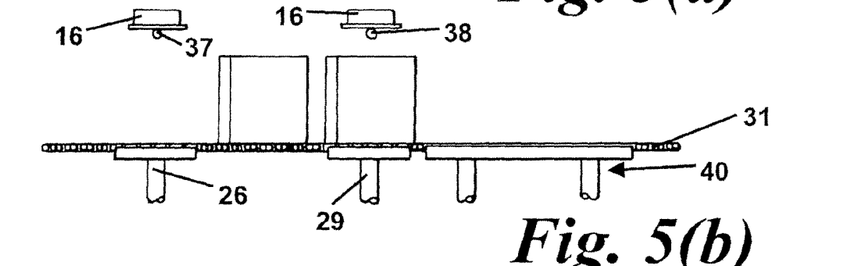
Figure 5C:
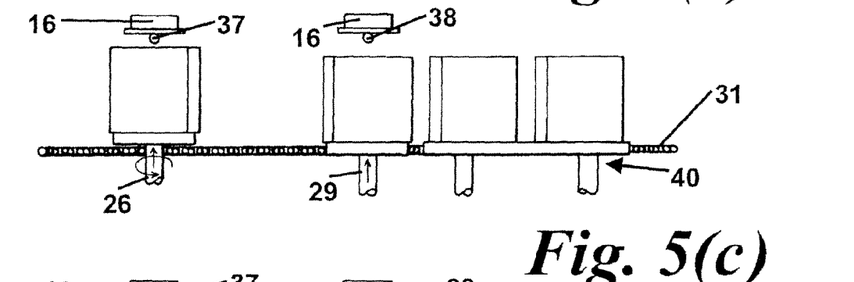
Figure 5D:
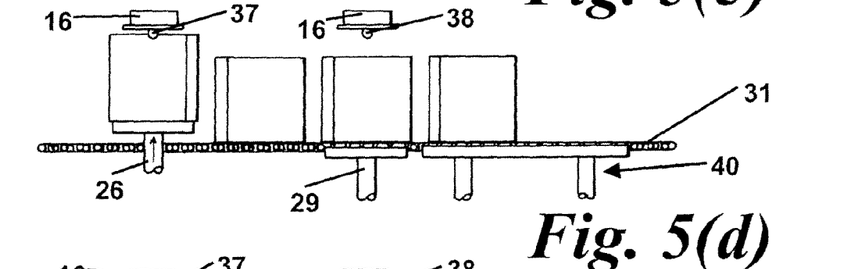
Figure 5E:
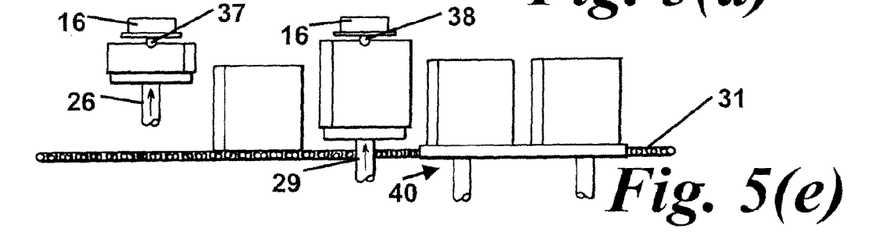
Figure 5F:
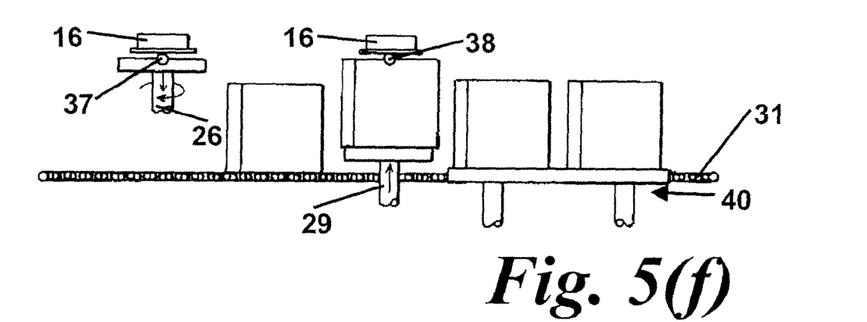
Figure 5I:
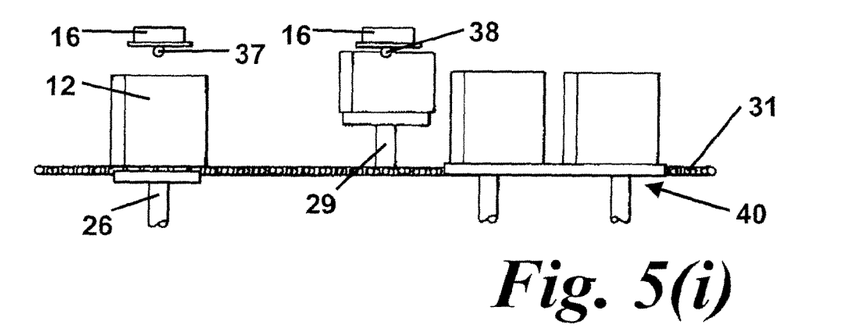
Figure 5J:
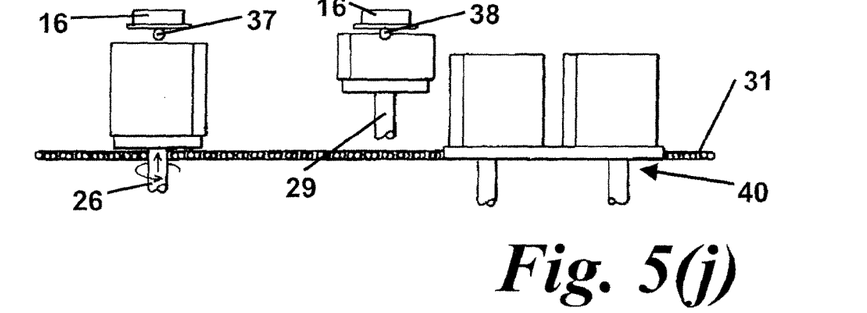
Figure 5K:
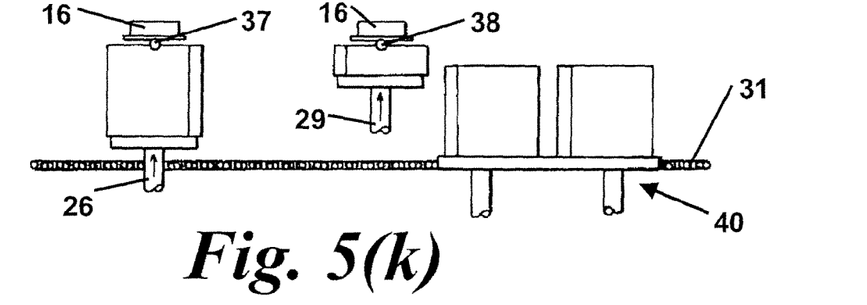
Figure 5L:
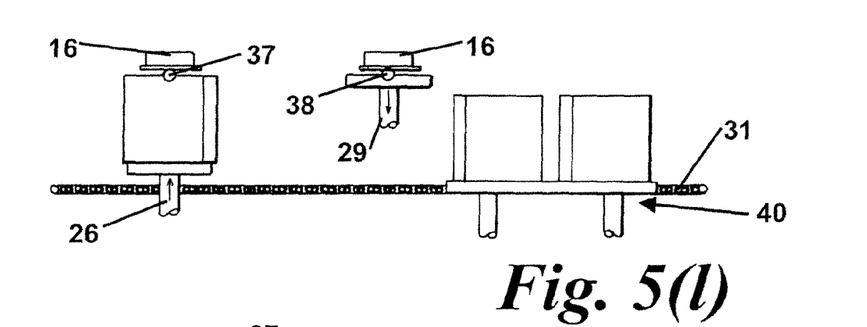
Figure 5M:
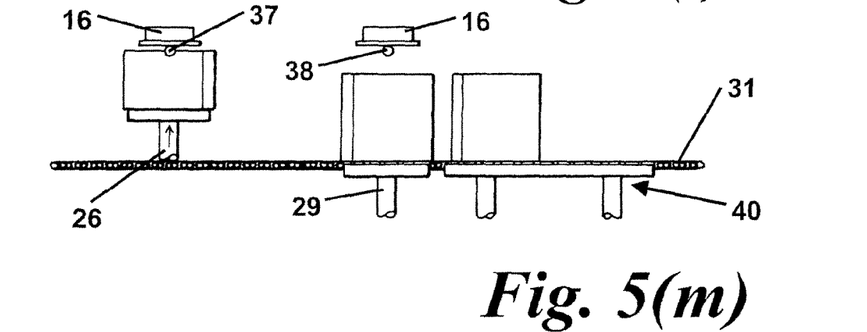
Figure 5N:
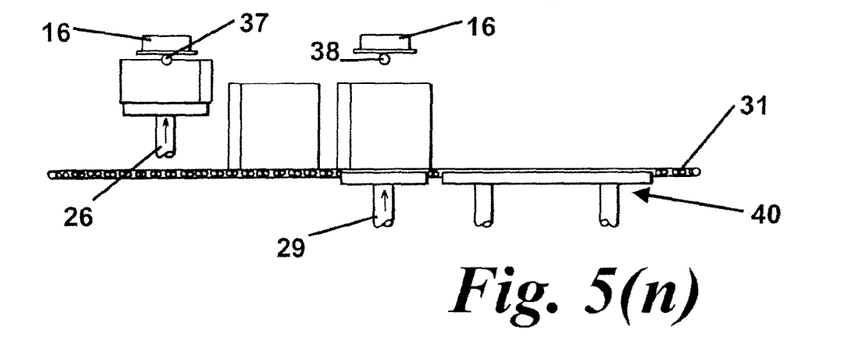
Figure 5O:
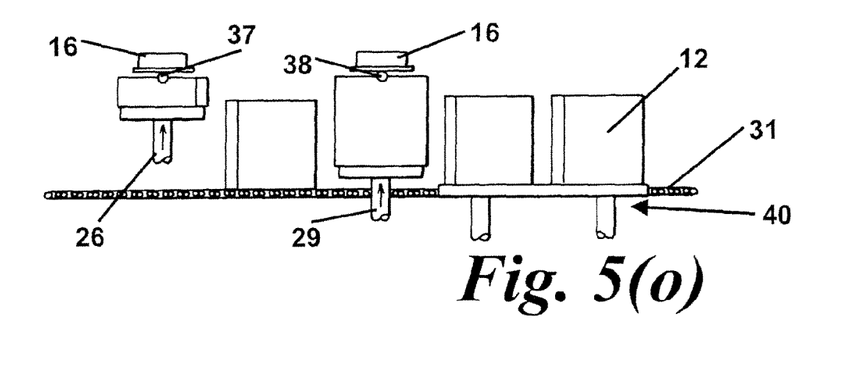

Variations on this design are described with reference FIGS. 4 to 6. FIGS. 4 and 5 show an arrangement, which deals with a problem that can arise using the previously described apparatus. As proposed in that apparatus plates are initially picked up by the nozzle 16 which is in pick up position A and when the associated stack 12 is used up the pick up or nozzle at 16 at position B begins to lift plates 11 from its associated stack 12. It has been found that if one waits until the last plate is lifted from elevator 26 before lifting elevator 29, then a space tends to occur between plates laid on out feed conveyor 13 because the nozzle instantaneously lying between A and B, which has passed over an empty stack, arrives at B before a plate is ready to pick up.

FIGS. 5(*a*) to (*o*) show a sequence of plate feeding, which overcomes this problem and introduces a slightly different approach to the alignment of lugs issue. Looking at FIG. 5(*a*) first, it will be noted that pick up positions A and B have respective sensors 37,38 for detecting the presence or absence of a plate 11 in the datum region from which a plate is picked up. The sensors 37,38, which are typically lasers that can be reflected in the absence of a plate in the datum region, are connected to the control 36 and in particular are used to control respective elevators 26 and 29. A further, double sized, elevator 40 is provided upstream of the elevator 29 in association with the feed conveyor 31.

Thus in FIG. 5(*a*) stacks 1 and 2 have been moved onto the elevator 40 by the in feed conveyor 31 and can be retained in that position by the elevator 40 lifting them clear of the conveyor 31. In FIG. 5(*b*) the stacks have been released by the conveyor 40 and moved downstream. Stack 2 lies above the elevator 29 and can be captured in that position by the elevator 29 lifting it clear of the conveyor bed. This can be seen in FIG. 5(*c*). The stack 1 has now reached elevator 26, which in this embodiment is configured as a turntable. Elevator 26 rotates the stack so that the lugs on the plates 11 will be suitably orientated and in the meantime further stacks 3 and 4 are delivered onto the elevator 40. In FIG. 5(*d*) elevator 26 lifts stack 1 so that plates are removed one by one, as previously described from stack 1, and released onto the conveyor 13. The sensor 37 detects the presence or absence of the top plate and controls the advancement of the elevator 26. In the meantime stack 2 has been released by elevator 29 to move into a buffer position intermediate elevators 26 and 29 and stack 3 has moved to a position in which it can be captured by the elevator 29.

It can be seen in FIG. 5(*e*) that the majority of the plates have now been removed from stack 1, but at this time stack 3 is elevated so that plates can be taken from it by a pick up in position B. In this way that stack is ready for having plates removed before stack 1 is finished, ie. both elevators are in an active position for an overlap period. By suitably controlling the valves on the pick up heads or nozzles 16, a continuous stream of plates can be achieved.

In Figure (f) stack 3 is now producing all of the plates to be passed on to the conveyor 13, whilst empty elevator 26 descends and returns to its original rotational orientation. As can be seen in FIG. 5(*i*) stack 2 then feeds onto elevator 26 and is rotated at (j). In FIG. 5(*k*) stack 2 is now elevated by elevator 26, because it is detected that stack 3 has been substantially used up. At (l) stack 2 has taken over as the feed stack and at (m) stacks 4 and 5 are being used to replenish. By FIG. 5(*o*) the apparatus has sequenced so that it corresponds with FIG. 5(*e*).

It will thus be seen that this approach handles both the issue of lug orientation and providing a continuous uninterrupted supply of plates to the conveyor 13.

Figures 6A, 6B:
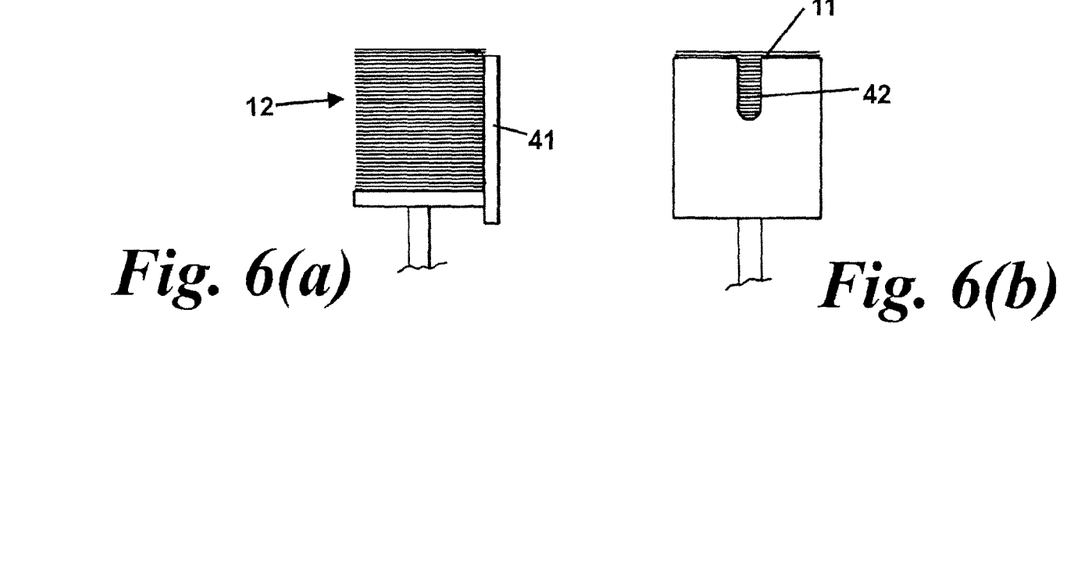

FIG. 6 shows an additional improvement which can be made. This is the provision of a stop plate 41 which can retain the stack 12 against any wiping drag, as the top plate 11 is removed. A vertical partial notch 42 is provided to allow the sensor to detect the presence or absence of plates.

Finally, it has been found, from the control point of view, that it is particularly efficacious to control the valves via one or more server motors.

It will be appreciated that the design could be varied in a number of other ways while still achieving the broad benefits of the invention. Thus the vacuum heads could be mounted on a chain conveyor or the like and do not necessarily have to follow a circular path. However, the use of a circular carrier enables the applicant to achieve a particularly small footpoint compared, for example, with the in-line machines mentioned in the acknowledged prior art. The elevators could be individually fed laterally and the turntable could be in the buffer position, rather than the position in which it is described. The invention thus covers any such variations or others clear to a person skilled in the art which fall within the scope of the attached claims.

The invention claimed is:

1. Apparatus for placing battery plates in a line from a stack of plates including an elevator for receiving a stack of plates and sequentially elevating the stack to maintain, in use, the uppermost plate in the stack in a datum region lying between two parallel generally horizontal planes and a plurality of vacuum heads arranged in a closed loop for sequentially passing over the elevator with a fixed gap from the upper plane of the datum range for picking up the uppermost plate and for subsequently releasing the plate at a release position, wherein the elevator is one of a plurality of elevators moveable between an inactive position and an active position, and further comprising at least one buffer elevator for temporarily halting travel of a stack along an input conveyor.

2. Apparatus as claimed in claim 1 further including a carrier rotatable about a generally vertical axis and wherein the vacuum heads are mounted on the carrier and spaced around the axis.

3. Apparatus as claimed in claim 2 further including an evacuable plenum and wherein each vacuum head is connectable to the plenum by a respective valve.

4. Apparatus as claimed in claim 3 further including a control for opening a valve, associated with a head, as the head approaches the elevator and for closing the valve when the head is the release position.

5. Apparatus as claimed in claim 1 including an output conveyor extending beneath the release position.

6. Apparatus as claimed in claim 1 including an input conveyor for delivering stacks of plates to the elevator.

7. Apparatus as claimed in claim 1 wherein only one elevator can be in an active position at any one time.

8. Apparatus as claimed in claim 2 wherein there are two elevators moveable between an inactive position and an active position, the two elevators arranged diametrically relative to the axis and the apparatus including an input conveyor extending along the diameter of the carrier.

9. Apparatus as claimed in claim 1 wherein two elevators can be active during an overlap period.

10. Apparatus as claimed in claim 9 wherein there are two input elevators arranged diametrically relative to a vertical axis and the apparatus including an input conveyor extending along the axis.

11. Apparatus as claimed in claim 1 further including a turntable for rotating a stack.

12. Apparatus as claimed in claim 11 wherein the turntable is an elevator.

13. Apparatus as claimed in claim 9 wherein the one conveyor is the most downstream conveyor.

14. Apparatus for placing battery plates in a line from a stack of plates including an elevator for receiving a stack of plates and sequentially elevating the stack to maintain, in use, the uppermost plate in the stack in a datum region lying between two parallel generally horizontal planes, a plurality of vacuum heads arranged in a closed loop for sequentially passing over the elevator with a fixed gap from the upper plane of the datum range for picking up the uppermost plate and for subsequently releasing the plate at a release position, and a turntable for rotating a stack.

15. Apparatus as claimed in claim 14 further including a carrier rotatable about a generally vertical axis and wherein the vacuum heads are mounted on the carrier and spaced around the axis.

16. Apparatus as claimed in claim 15 further including an evacuable plenum and wherein each vacuum head is connectable to the plenum by a respective valve.

17. Apparatus as claimed in claim 16 further including a control for opening a valve, associated with a head, as the head approaches the elevator and for closing the valve when the head is the release position.

18. Apparatus as claimed in claim 14 including an output conveyor extending beneath the release position.

19. Apparatus as claimed in claim 14 including an input conveyor for delivering stacks of plates to the elevator.

20. Apparatus as claimed in claim 14 including a plurality of elevators movable between an inactive position and an active position.

21. Apparatus as claimed in claim 20 wherein only one elevator can be in an active position at any one time.

22. Apparatus as claimed in claim 15 wherein there are two elevators moveable between an inactive position and an active position, the two elevators arranged diametrically relative to the axis and the apparatus including an input conveyor extending along the diameter of the carrier.

23. Apparatus as claimed in claim 20 wherein two elevators can be active during an overlap period.

24. Apparatus as claimed in claim 23 wherein there are two input elevators arranged diametrically relative to a vertical axis and the apparatus including an input conveyor extending along the axis.

25. Apparatus as claimed in claim 20 wherein including at least one buffer elevator for temporarily halting travel of a stack along an input conveyor.

26. Apparatus as claimed in claim 14 wherein the turntable is an elevator.

27. Apparatus as claimed in claim 23 wherein the one conveyor is the most downstream conveyor.

* * * * *